(No Model.) 2 Sheets—Sheet 2.
J. S. ASH.
DUST COLLECTOR.
No. 387,617. Patented Aug. 14, 1888.
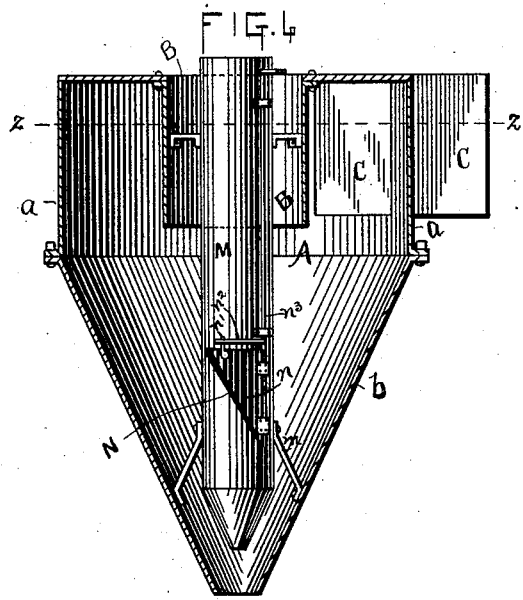
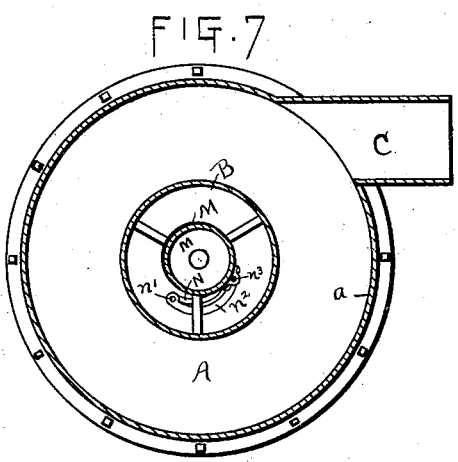
WITNESSES:
Geo. B. Fravel.
Ira C. Koehne.
INVENTOR,
Joseph S. Ash,
BY C. C. Shepherd,
HIS ATTORNEY.

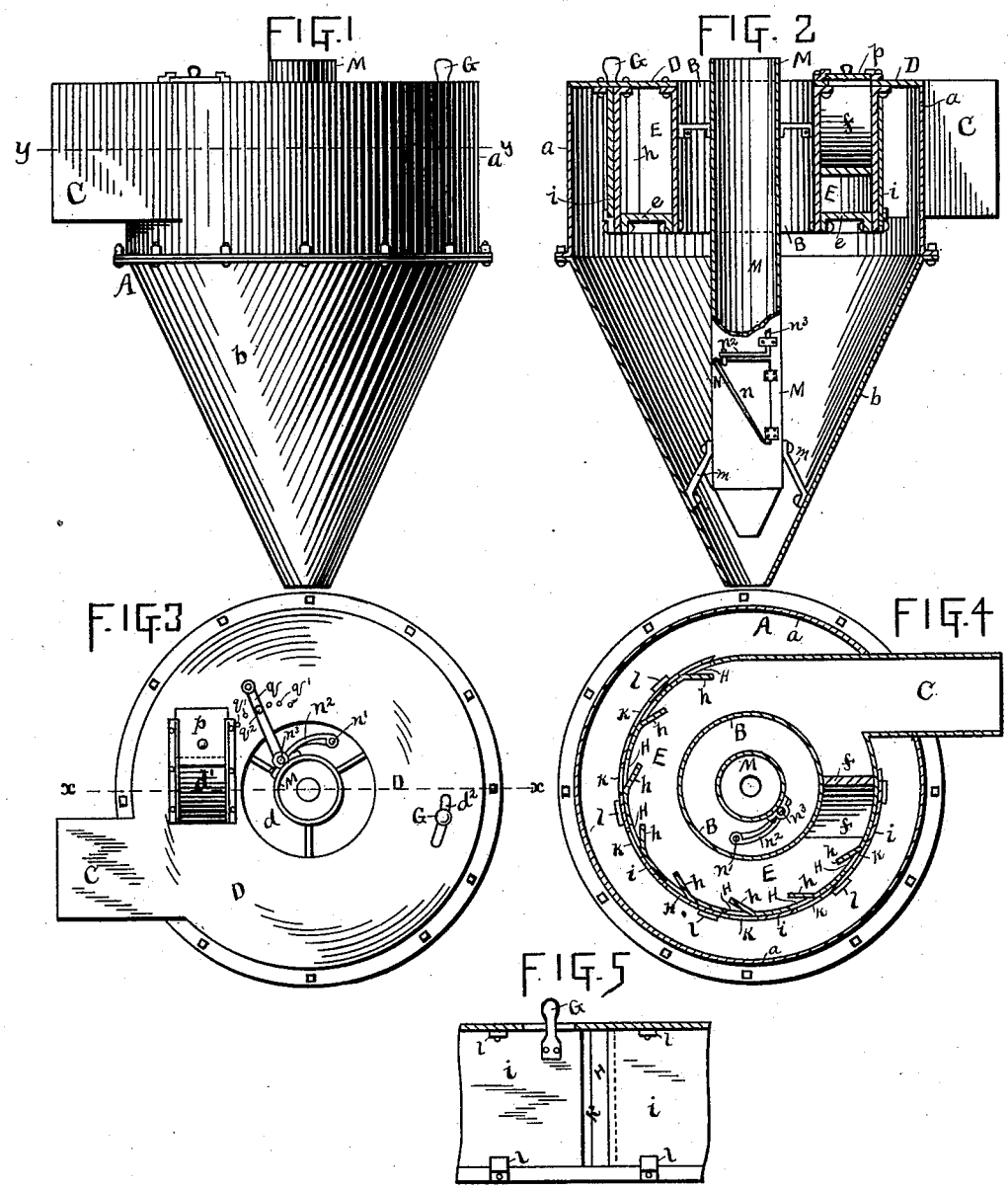

UNITED STATES PATENT OFFICE.

JOSEPH S. ASH, OF CANAL WINCHESTER, OHIO, ASSIGNOR OF ONE-HALF TO CHARLES B. COWAN, OF SAME PLACE.

DUST-COLLECTOR.

SPECIFICATION forming part of Letters Patent No. 387,617, dated August 14, 1888.

Application filed February 14, 1888. Serial No. 264,009. (No model.)

*To all whom it may concern:*

Be it known that I, JOSEPH S. ASH, a citizen of the United States, residing at Canal Winchester, in the county of Franklin and State of Ohio, have invented a certain new and useful Improvement in Dust-Collectors, of which the following is a specification.

My invention relates to the improvement of dust-collectors of that class used in flouring-mills and other similar establishments where it is desired to separate the dust or solid particles from a current of dust-laden air, and has particular relation to that class of collectors having an outer cylindrical and conical case and an inner cylindrical air-escape.

The objects of my invention are to provide a simple, inexpensive, and effective device of this class so constructed as to facilitate the separation of the dust and air; to regulate the force of the current of air within the outer cylinder or case, and in so doing to utilize the central portion of the inner air-escape pipe as well as the space adjoining its inner surface, and to so construct said collector as to prevent the current of the purified or partially-purified air from again coming in contact and mingling with the incoming current of dust-laden air. These objects I accomplish in the manner illustrated in the accompanying drawings, in which—

Figure 1 is an elevation of my improved dust-collector with its supporting-frame removed. Fig. 2 is a vertical longitudinal section taken on line $x$ $x$ of Fig. 3. Fig. 3 is a plan view. Fig. 4 is a transverse section taken on line $y$ $y$ of Fig. 1. Fig. 5 is a view of a portion of the damper. Fig. 6 is a vertical longitudinal section of a modified form of my device, and Fig. 7 is a transverse section taken on line $z$ $z$ of Fig. 6.

Similar letters refer to similar parts throughout the several views.

A represents the outer metallic casing of the collector, which consists of a cylindrical upper portion, $a$, and a conical lower portion, $b$, said conical and cylindrical portions being preferably formed separately, having their adjoining flanged edges bolted together, as shown.

D represents a permanent top plate having a central circular opening, $d$, and, as hereinafter described, openings $d'$ $d^2$.

B represents an internal pipe, of a diameter corresponding with the diameter of the opening $d$, having its upper end secured about the edge of said opening, and, extending vertically downward, has its lower open end terminating at a point near the lower terminus of the cylindrical portion $a$ of the outer case.

Extending downward from the under surface of the top plate, D, to which it is rigidly secured, is the wall of a cylindrical chamber, E, made concentric with the pipe B about midway between said pipe B and the outer case, $a$. This chamber E is provided, as shown, with a suitable bottom plate, $e$.

Made to pass through the wall of the outer case, A, and entering the internal chamber, E, tangentially is a dust-laden air-spout, C. This spout may be formed with and as a continuation of said chamber-wall, as shown, or may be formed separately and connected therewith in any suitable manner.

Made to extend between the wall of the chamber E and the pipe B and between the top plate, D, and chamber-bottom $e$ is a partition-wall, $f$. The upper end of this partition-wall is in line with and forms a continuation of the shorter sides of the spout C. From said upper end the partition-wall curves downwardly and forwardly away from said spout, and has its lower end secured to the bottom $e$ of the chamber E. Immediately above the partition-wall is formed in the top plate, D, an oblong opening, $d'$.

The wall of the chamber E is provided at intervals with vertical slotted openings H. Each of these openings is preferably formed by producing a vertical cut in the wall of the chamber of the height of the proposed opening and producing from the upper and lower ends of said vertical cut a short cut at right angles therewith, and forcing the material embraced within said cuts inward until in a position tangent with the wall, thus forming a number of inwardly-projecting wings, $h$.

Against the outer side of the slotted portion of the wall of the chamber E is made to bear and slide a damper, $i$, consisting of a sheet of metal curved to conform to the shape of the chamber-wall, and having formed therein a number of vertical slotted openings, $k$, corresponding in position with the openings H.

Guide-lugs $l$, in which the damper $i$ is made to rest, are made to project from the outer side of the wall of the chamber E near the upper and lower edges thereof.

G represents a vertical handle-bar having its lower end rigidly secured to the damper $i$, and having its upper end extending through a curved slot, $d^2$, in the top plate, D.

M represents a vertical pipe, of a diameter equal to about one-half the diameter of the pipe B, said pipe being supported within and made to pass vertically through the center of said pipe B from the top thereof to a point near the lower end of the conical portion $b$ of the case, its lower end being preferably formed conical, as shown, and provided with a small opening at its apex. This internal pipe, M, is supported in this position by means of suitable supporting-rods, $m\ m'$, made to project, respectively, from the inner walls of the pipe B and outer conical case. Formed in the side of said pipe M is a triangular opening, N, having a correspondingly-shaped door, $n$, hinged to one edge of said opening. Projecting upwardly from the upper end of the door $n$, near its front side, is a short pin, $n'$, having its upper end extending loosely through a hole formed in the outer end of a curved arm, $n^2$, extending above the top of the door and having its rear end rigidly connected with a vertical operating-rod, $n^3$, which, being supported loosely in suitable bearings made to project from the pipe M, extends upwardly through the case and pipe B to a point above the case, as shown. Over the opening $d'$ in the top plate is a regulating-slide, $p$, consisting of a metallic plate seated in suitable grooved bearings projecting from the top plate on either side of the said opening.

The above-described device, with the exception of the central pipe, M, and slide $p$, is substantially the same as that shown and described in a former application for patent made by me on the 10th day of June, 1887, Serial No. 240,893.

The operation of my present device is as follows: The damper being in such position that the openings H in the wall of the chamber E are open, or partially so, a strong current of dust-laden air passing through the spout C will enter the chamber E, the centrifugal force of the current within the chamber causing the dust or solid particles to follow the inner surface of the outer wall of the chamber and, together with a portion of the air, be directed by the wings or skimmers $h$ out through the openings H and $k$ into the case A. The remaining portion of the air thus purified will be forced out the opening $d'$ in the top plate, being deflected outward by its contact with the curved partition $f$. The circular form of the outer case, A, and the force of the current will operate to continue the centrifugal movement of the mingled dust and air which has escaped through the chamber-openings within the outer case, A, the dust following the inner surface of said case spirally downward until it escapes through the opening in the bottom or apex of the conical lower portion thereof. As shown and described in said former application, the air within the outer case is allowed to escape upward through the pipe B. I have found by experiment that the current of purified air thus escaping follows spirally the inner surface of said pipe B, thereby leaving a central space within said pipe not utilized. I have also found that the movement of said outwardly-escaping air-current operates to produce a downward or inward suction of air through said central portion of the pipe B into the case. I have obviated this difficulty and utilized the central portion of the pipe B as an air-escape by combining with my device, in the manner described, the central vertical pipe, M. That portion of the air which does not escape, as above described, through the pipe B is allowed to enter the hole N of the pipe M, being guided or deflected therein by contact with the door $n$, the latter being held partially open, as shown. The position of the door $n$ may be regulated at will by revolving the rod $n^3$, which, through its connection with the arm $n^2$ and door-pin $n'$, will cause the outward or inward movement of the door to fix the same at the desired angle with the pipe M.

It will be observed that the curved partition $f$ will not only serve to deflect the air upward through the opening $d'$, but will prevent the purified air-current from meeting, mingling with, and retarding the incoming stream of dust-laden air.

It is obvious that the movement of the dust through the chamber-openings is dependent upon the force of the air-current within the chamber, and that said movement or passage of the dust is effected by the force and volume of the air within the outer case, and when the last-mentioned force becomes equal to or greater than the first-mentioned force the movement outward of said dust particles is retarded or stopped. This result is prevented by regulating the size of the dust-openings H by movement of the damper until the openings of said damper and chamber are in the desired relative position. The volume and force of the current of air passing out through $d'$ may be regulated by the movement of the slide $p$, operating to change the size of said opening. It will also be observed that the central air-pipe, M, may be combined with that known form of collector wherein the spout C is made to communicate simply with the interior of the case, and an internal pipe corresponding with the pipe B is used for the air-escape.

As shown in Fig. 3 of the drawings, I may provide the upper end of the operating-rod $n^3$ with an outwardly-extending handle, $q$, the latter adapted to be held in the desired position by means of a pin, $q^2$, made to pass through a hole in the handle $q$, and thence into the desired one of a curved row of holes, $q'$, formed in the top plate of the collector.

Having now fully described my invention, what I claim, and desire to secure by Letters Patent, is—

1. In a dust-collector, the combination, with the case A, having a discharge-opening in its lower end and an opening, d, in its top plate, and inlet-spout C, of the internal pipe, B, and central internal pipe, M, having lateral opening N near its lower end, substantially as and for the purpose specified.

2. In a dust-collector, the combination, with the case A, having a discharge-opening in its lower end and an opening, d, in its top plate, and inlet-spout C, of the internal central pipe, M, having lateral opening N, and door n, having pin n', arm n², connected with said pin, and operating-rod n³, substantially as and for the purpose specified.

3. In a dust-collector, the combination, with the case A, composed of a cylindrical portion, a, and conical portion b, having an opening at its lower end, and top plate, D, having openings d and d', of the chamber E, having slotted openings H and spout C, communicating with said chamber, and central air-pipes, B and M, the latter being supported within the former and within the case A and having an opening, N, in its lower portion, substantially as and for the purpose specified.

4. In a dust-collector, the combination, with the case A, composed of a cylindrical portion, a, and conical portion b, having its lower end open, and top plate, D, having openings d d' d², and slide p, of the chamber E, having slotted openings H, inlet-spout C, communicating with said chamber, sliding slotted damper having handle G, and central air-pipes, B and M, the latter supported vertically within the former and within the case A and having an opening, N, in its lower portion, substantially as and for the purpose specified.

JOSEPH S. ASH.

In presence of—
GEO. B. FRAVEL,
C. C. SHEPHERD.